E. R. HEWITT.
ENGINE CRANK CASING.
APPLICATION FILED DEC. 30, 1910.

1,135,524.

Patented Apr. 13, 1915.
3 SHEETS—SHEET 1.

Witnesses:
John Darby
H. Muchmore

Inventor
Edward R. Hewitt
By his Attorney

UNITED STATES PATENT OFFICE.

EDWARD R. HEWITT, OF RINGWOOD, NEW JERSEY, ASSIGNOR TO HEWITT MOTOR COMPANY, OF NEW YORK, N. Y., A CORPORATION OF NEW YORK.

ENGINE-CRANK CASING.

1,135,524.    Specification of Letters Patent.    Patented Apr. 13, 1915.

Application filed December 30, 1910. Serial No. 600,027.

*To all whom it may concern:*

Be it known that I, EDWARD R. HEWITT, a citizen of the United States, resident of Ringwood, in the county of Passaic, State of New Jersey, have invented certain new and useful Improvements in Engine-Crank Casings, of which the following is a specification, reference being had to the accompanying drawings, forming a part hereof.

My invention in particular relates to engine construction and has for its object primarily to simplify the construction thereof so as to facilitate assembling, inspection and repair.

While applicable in other cases, my invention is particularly suitable in the case of engines for automobiles, and in the particular form hereinafter shown and described it is embodied in an automobile engine. The construction permits the engine and its associated parts to be permanently supported by a main housing while the inclosed crank case may be opened by the removal, in a most simple and rapid manner, of a lower section, affording access to all of the internal moving parts in the crank chamber without disassembling or changing the adjustment of any such parts.

Figure 1:
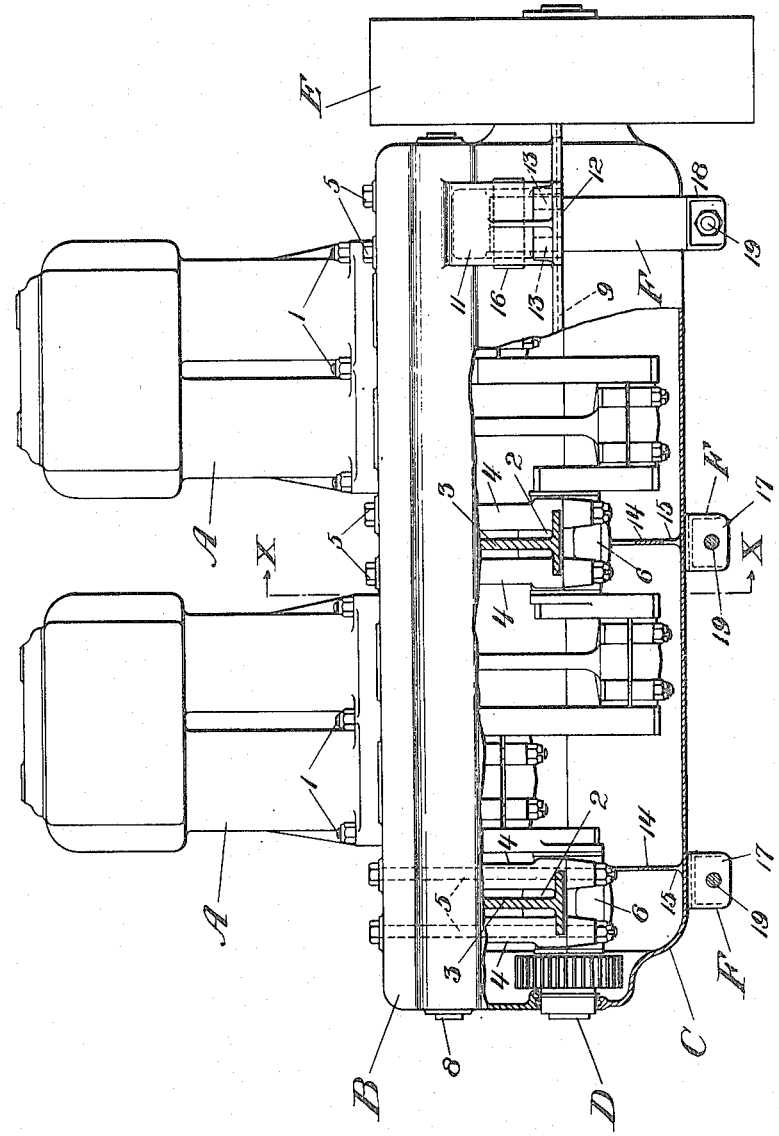
Figure 2:
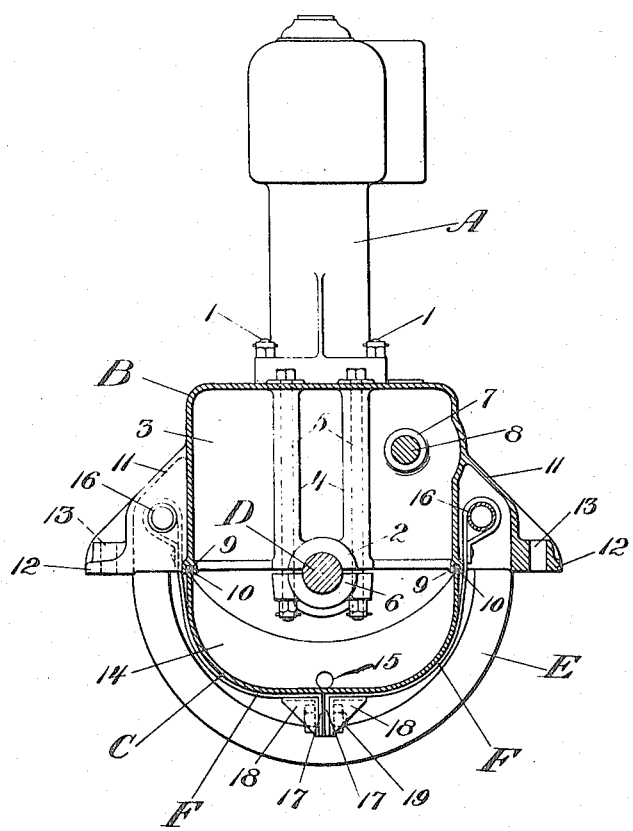
Figure 3:
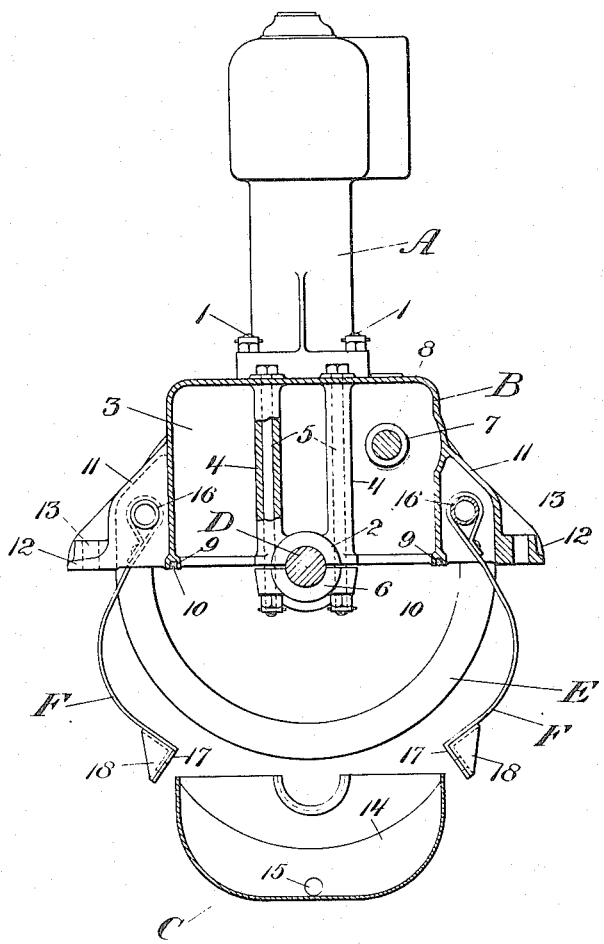

In the accompanying drawings—Figure 1 is a side elevation of an engine embodying the present invention, partly in section. Fig. 2 is a section on the line X—X of Fig. 1, showing the lower crank case assembled. Fig. 3 is a view similar to Fig. 2 with the lower crank case removed.

A, A represent the cylinders, B the upper or main section of the crank case, C the lower or detachable crank case section, D the crank shaft, E the fly-wheel and F, F the clamping straps.

The cylinders A, A, are secured to the upper crank case section B, by bolts 1, 1, in the usual manner. The crank shaft bearings 2, 2 are integral with the upper crank case B and are formed in the lower edges of the laterally extending webs 3, 3, which serve as supports for the bearings and as stiffening members for said crank case. Through tubular columns 4, 4, integral with the crank case B and extending from the projections of the bearings 2, 2, on either side of the webs 3, 3, to the upper face of said crank shaft, pass bolts 5, 5, by which the crank shaft bearing caps 6, 6, are secured to the crank shaft bearings. Bearings, other than those for the crank shaft, are formed in the webs 3, 3, in any suitable manner, such as, the cam shaft bearings 7, 7, supporting the cam shaft 8.

Around the lower edge of the upper crank case B is a recess or groove 9 in the casing, adapted to receive a packing strip 10 of felt, rubber or other suitable material, the purpose of which will be hereinafter set forth.

Extending from either side of the crank case B, preferably at points opposite the crank shaft bearings 2, 2, are housings 11, 11, terminating at their outer and lower extremities in lugs 12, 12, which serve as supporting members for the engine and which may be secured to any suitable framing by bolts passing through the holes 13, 13.

The lower crank case section C is designed to admit of the movement of any rotating engine parts below the upper crank case C, and is so formed at its upper edge as to register with the groove 9 in the lower edge of the upper crank case B; except at the points where the crank shaft D passes through the engine housing. At the last named points the case is formed to receive the shaft D and has grooves in its edge surrounding the shaft or its bearings for the reception of felt washers, or washers of other suitable material, to prevent the leakage of oil from the crank case.

The lower crank case C, has cast integral with it, the laterally extending stiffening members or webs 14, 14, dividing the said case into a plurality of sections. These webs are provided with holes 15, 15, for the passage of oil from one section to the other.

The housings 11, 11, extending from the upper crank casing B are adapted to receive the hollow pins 16, from which are pivotally swung the clamping straps F, F. The straps F, F, depend downwardly from their supporting pins 16, 16, are bent to conform to the lateral and lower outer surface of lower crank case C, are angled at their lower extremities 17, 17, to form lugs, and are provided with stiffening members 18, 18, through which and the said angled portions 17, 17, pass the single clamping bolts 19, 19.

The lugs 17, 17, of the straps F, F, do not meet in their clamped position, but are spaced apart to allow for the drawing action of the bolts 19, 19.

From the above description, the method of assembling or dismembering the lower crank case section C and the upper crank case section B is readily seen to be as follows: In assembling, the upper peripheral edge of the crank case C is registered against the packing strip 10 in the groove 9 of the upper crank case B and the clamping straps F, F, are brought under the lower case C and their free ends attached and drawn tightly together by the clamping bolts 19, 19, to force the upper edge of the crank case C into the yielding packing 10 of the crank case B, thus forming an air proof and dust proof inclosure for the engine and its associated parts. The webs 14, 14, in the crank case C act as compression members against the clamping straps F, F, and serve to equalize the pressure of said case against the packing 10 in the crank case B. By the unclamping of the bolts 19, 19, and the swinging outwardly of the clamping straps F, F, the lower crank case C may be immediately detached from the upper crank case B, leaving all the operating mechanism, inclosed by the crank case, open to inspection.

It will be understood, from the structure shown, that the lower crank case C does not support any of the moving mechanism of the engine and serves only as an inclosing member for said mechanism.

It will now be seen that in the practice of my invention an engine can be completely assembled and adjusted, particularly as to its crank shaft, piston rods, timing gears and any other operating parts after mounting on the chassis. The parts are supported in operative position fully adjusted and the bearings remain accessible for any purpose desired. Thereupon the lower or sub-casing is brought into position and the clamping straps are swung into contact with the lower casing, and clamped securely by a single bolt inserted through the adjacent ends of the strap portions. By means of this single bolt each strap is tightened in position and serves to draw the sub-casing into forced contact around its upper edges, with the dust and oil tight bearing on the lower side of the main casing. By applying the pressure of the clamping straps to the lower surface of the curved lower crank case, the curvature tends to cause the distribution of the pressure against the felt in the groove equally all along the edge, whereas if the sections were clamped at the top, the pressure would only be in the vicinity of the bolt. By my construction I obtain a tighter joint than it is possible to secure by means of a plain surface and gasket or other means now usual in engine construction.

In engine construction, particularly automobile engines, as heretofore supported, it has been usual to attach the lower and upper sections of engines by bolting together their machined flanges, necessitating as many as a dozen or more bolts. In the present construction, however, the whole bottom of the engine can be left rough, except the bearing surfaces, and the upper edge of the lower crank case need not be machined, as proper contact with the felt groove will make a tight joint, the result being a very material saving in the cost of manufacture. Furthermore, it has been usual to have the main bearings and other parts so arranged that upon the separation of the crank case sections the bearings were removed or separated, the gears or other parts disengaged and in other respects the adjustment of all operating parts changed, so that reassembly of the crank case became a matter of difficulty and required much time and care to actually accomplish.

While I have herein shown and described one particular embodiment of my invention, it will be evident that the same is capable of modification in many details and arrangement of construction, but

What I claim and desire to secure by Letters Patent is:

1. In combination in an engine crank casing, an upper or main section having means for supporting the entire engine, a removable sub-section, and straps supported by the main section and embracing the sub-section whereby the sub-section may be drawn into contact with the main section uniformly throughout the length of their contacting edges and the weight of the sub-section is supported by the straps.

2. In combination in an engine crank casing, an upper or main section having means for supporting the entire engine, a removable sub-section having its upper edges adapted to fit the lower edges of the upper section and having webs formed in it, and straps supported by the upper section and each embracing the sub-section under a web whereby the clamping strain is distributed to bring the sub-section edges in uniform contact with the edges of the upper section.

This specification signed and witnessed this 29 day of December, A. D. 1910.

EDWARD R. HEWITT.

Witnesses:
H. MUCHMORE,
HERMAN F. CUNTZ.